ated June 30, 1970

3,518,327
PHOSPHORO AND PHOSPHONO
ACETYLHYDRAZIDES
Ralph B. Fearing, Bardonia, N.Y., assignor to Stauffer
Chemical Company, New York, N.Y., a corporation
of Delaware
No Drawing. Continuation-in-part of application Ser. No.
423,356, Jan. 4, 1965. This application Apr. 10, 1967,
Ser. No. 629,401
Int. Cl. C07f 9/08, 9/16; A01n 9/36
U.S. Cl. 260—923                                    9 Claims

ABSTRACT OF THE DISCLOSURE

This invention is for novel pesticides having the general formula

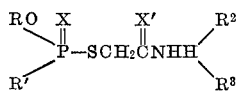

wherein R is lower alkyl; R' is lower alkyl or lower alkoxy; the radicals represented by X and X' are independently selected from the group consisting of oxygen and sulfur; $R^2$ and $R^3$ are independently selected from the group consisting of hydrogen, methyl, ethyl, formyl, acetyl, and in combination can be selected from the group consisting of ethylidene and methylene. The lower alkyl radicals suitable for R and R' are the straight and branched chain aliphatic radicals having from 1 to 8 carbons, and include for example, methyl, ethyl, n-propyl, isopropyl, amyl, octyl, and the like. Similarly the lower alkoxy radicals suitable for R' are the straight and branched chain radicals having from 1 to 8 carbons and include methoxy, ethoxy, n-propoxy, isopropoxy, amyloxy, octyloxy and the like. Particularly effective as pesticides in the control of insects such as M. domestica, B. germanica, and O. fasciatus. They are also effective in the control of acarids, such as tetranychus telarius, both contact and systemic.

This application is continuation-in-part application of Ser. No. 423,356 filed Jan. 4, 1965, now abandoned.

The present invention is directed to a novel group of dialkyl thio and dithio phosphoro and phosphono acetylhydrazides, their method of preparation and use as pesticides.

The novel pesticides of the invention may be represented by the gerenal formula

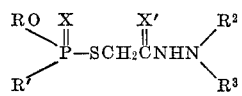

wherein R is lower alkyl; R' is lower alkyl or lower alkoxy; the radicals represented by X and X' are independently selected from the group consisting of oxygen and sulfur; $R^2$ and $R^3$ are independently selected from the group consisting of hydrogen, methyl, ethyl, formyl, acetyl, and in combination can be selected from the group consisting of ethylidene and methylene. The lower alkyl radicals suitable for R and R' are the straight and branched chain aliphatic radicals having from 1 to 8 carbons, and include for example, methyl, ethyl, n-propyl, isopropyl, amyl, octyl, and the like. Similarly the lower alkoxy radicals suitable for R' are the straight and branched chain radicals having from 1 to 8 carbons and include methoxy, ethoxy, n-propoxy, isopropoxy, amyloxy and octyloxy and the like.

The general process for preparing the novel pesticides may be illustrated by the following reaction:

(1)
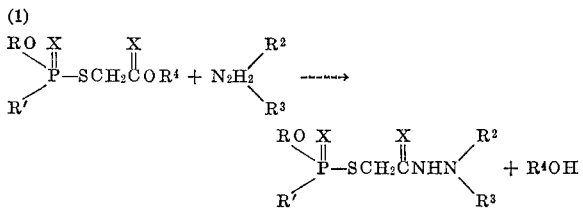

wherein R, R', X, X', $R^2$ and $R^3$ are as hereinabove defined; and $R^4$ is a lower alkyl. The reaction is preferably carried out in the presence of a solvent selected from the group consisting of primary, secondary, and tertiary aliphatic alcohols which include for example, methanol, ethanol, propanol, butanol, and the like, but no solvent is required. Alcohols in excess of 5 carbons are not as desirable as the lower alcohols because the higher boiling points of the former make separation difficult in that the product is more likely to decompose when distilling at the higher temperatures required.

The temperature of the reaction, broadly 0° C. to 50° C., is not critical, but must not be so high as to cause the formation of side products, or so low as to require an excessively long reaction time. The preferred temperature range is between about 25° C. and 35° C.

Stoichiometric quantities of the reactants are used and the reaction is only mildly exothermic so that it may be easily controlled. After removing the by-product alcohol by distillation, a pure phosphoro or phosphono acetylhydrazide may be recovered by washing the reaction mixture with water or aqueous solutions of sodium carbonate. For convenience, the reaction mixture may first be dissolved in an inert organic solvent such as benzene, ether, and the like, and then washed. Normally the reaction will yield between 60% and 93% of the theoretical predicted amount of phosphoro acetylhydrazide or phosphono acetylhydrazide.

The preparation of the dialkyl phosphoro and phosphono thio and dithio acetate intermediates is illustrated by the following reaction:

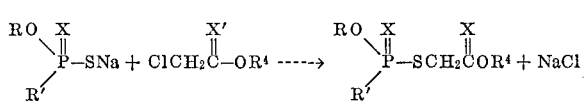

wherein R, R', $R^4$ and X and X' are as previously defined. An example of the preparation of one specific intermediate useful in this invention follows:

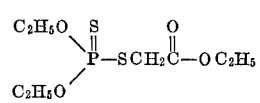

To a reaction flask fitted with a thermometer and stirrer were added 41.6 grams (0.2 mol) of sodium diethyl phosphorodithioate and 30 grams (0.2 mol) of ethyl chloroacetate. After stirring for several hours the solution was allowed to deposit sodium chloride over night, and was then heated to 53° C. for three and a half hours. The remaining sodium chloride was colloidal so that about 1 cc. of water was added to coagulate the sodium chloride which was thereafter filtered and washed with 100 cc. of benzene. The filtrate was then concentrated to 80° C. at 0.5 mm. Hg to yield 34 grams of ethyl diethyl phosphorodithioacetate.

An alternative process for preparing the novel pesticides is illustrated by the following reaction:

(2)

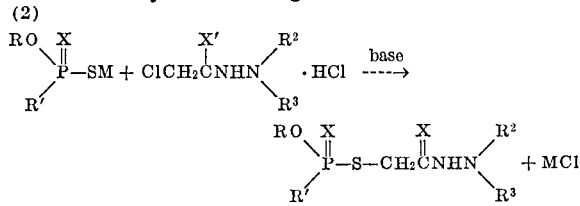

where M is an alkali metal, such as sodium or potassium, and R, R', X, X', $R^2$ and $R^3$ are as hereinabove defined. The condensation reaction (2) can be conveniently carried out in the presence of a solvent, described supra, but no solvent is required.

The preparation of the intermediate N,N-dialkyl chloroacetylhydrazide hydrochloride used in Equation 2 can be illustrated by the following reaction:

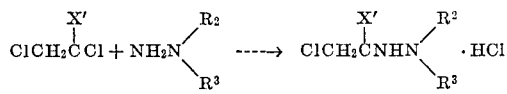

wherein X, X', $R^2$ and $R^3$ are as previously defined.

The following specific examples illustrate the preparation of the novel compounds of the invention.

EXAMPLE 1

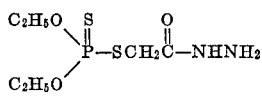

To a reactor flask fitted with a thermometer and stirrer were added 34 grams (0.12 mol) of ethyl diethylphosphorodithioacetate dissolved in 30 ml. of ethanol and 4 grams of hydrazine dissolved in 20 ml. of ethanol. The reaction matrix was mildly exothermic. The reaction was allowed to stand for three days and then concentrated to 3 mm. Hg (at 40° C.) to remove the ethanol. 100 cc. of benzene was added and the solution was washed with successive 50 cc. portions of water, 2% aqueous sodium carbonate solutions, and water. The product was then concentrated at 1 mm. Hg to 60° C. to give 28 grams (0.10 mol) of diethyl phosphorodithioacetyl hydrazide having an index of refraction $n_D^{25}=1.5370$; an average analysis of 8.97% N as compared to 10.8% N, theoretical.

EXAMPLE 2

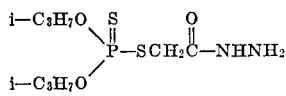

To a reactor flask fitted with a thermometer and stirrer was added 42 grams (0.14 mol) of ethyl diisopropyl phosphorodithioacetate dissolved in 60 ml. of ethanol. The solution was then treated slowly at 10° C. with a solution of 4.7 ml. (0.14 mol) of hydrazine dissolved in 10 ml. of ethanol. The mixture was allowed to warm to room temperature and stand overnight. After heating for 1.5 hours at 40° C., the product was concentrated at 1 mm. Hg to 60° C. to yield 37.5 grams of diisopropyl phosphorodithioacetyl hydrazide having an index of refraction $n_D^{25}=1.5220$; and an average analysis of 9.6% N as compared to 9.8% N, theoretical.

EXAMPLE 3

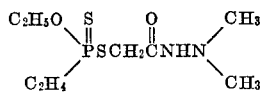

In a reaction flask containing 250 ml. of methyl ethyl ketone was added 0.1 mole of N,N-dimethyl chloroacetylhydrazide hydrochloride and potassium ethyl-ethoxy-dithiophosphonate along with 0.1 mole of potassium carbonate and 0.5 g. copper powder. The mixture was heated for 1 hour at reflux temperature. After this heating period the solvent was removed in vacuo. The residue was taken up in methylene chloride, washed with portions of water and dried over anhydrous magnesium sulfate. After filtering to remove the drying agent, the solution was filtered and the solvent evaporated. There was obtained 17 g. of a liquid identified as the title compound having an index of refraction $n_D^{30}$ 1.5406.

The following compounds were prepared by a procedure substantially in accordance with Examples 1 and 2.

EXAMPLE 4

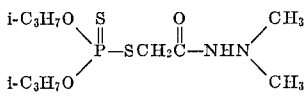

Diisopropyl phosphorodithioacetyl dimethyl hydrazide having an index of refraction $N_D^{25}=1.4860$; and an average analysis of 8.9% N as compared to 8.9% N, theoretical.

EXAMPLE 5

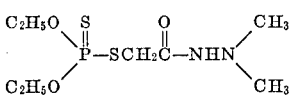

Diethyl phosphorodithioacetyl dimethylhydrazide having an average analysis of 8.2% N as compared to 9.8% N, theoretical.

The following compounds may be prepared by a procedure substantially in accordance with Examples 1 and 2.

EXAMPLE 6

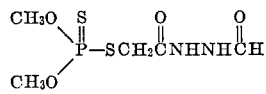

Dimethyl phosphorodithioacetyl formyl hydrazide.

EXAMPLE 7

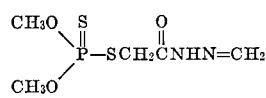

Dimethyl phosphorodithioacetyl methylenehydrazide.

Although the new phosphoroacetylhydrazides have been found to be generally active as pesticides, their miticidal activity, especially with the two-spotted mite *Tetranychus telarius,* is unexpectedly high. Insecticidal activity for the phosphoroacetylhydrazides is illustrated in Table I wherein the percentage kill among the pest species is reported for a specified quantity of candidate compound, expressed in micrograms (μg.—herein termed the bioassay test), or for a percentage concentration in aqueous dispersion (hereinafter termed the screening test). A slanted line is used to separate the percentage kill for the pest species shown on the left from the percentage concentration (screening) or total quantity (bioassay) shown on the right.

Insect test species

Housefly—*Musca domestica* (Linn.)
German cockroach—*Blatella germanica* (Linn.)
Spotted milkweed bug—*Oncopeltus fasciatus* (Dallas)

Mite test species

Two-spotted mite—*Tetranychus telarius* (Linn.)

In the screening tests for the insect species of Table I, from ten to twenty-five insects were caged in cardboard mailing tubes 3⅛" in diameter and 2⅝" tall. The cages were supplied with cellophane bottoms and screen tops. Food and water were supplied to each cage. Dispersions of the test compounds were prepared by dissolving one-half gram of the toxic material in 10 ml. of acetone. This solution was then diluted with water containing 0.0175% v./v. Sponto 221®, an emulsifying agent, the amount of water being sufficient to dilute the active ingredients to a concentration of 0.1% or below. The test insects were then sprayed with this dispersion. After twenty-four and seventy-two hours, counts were made to determine living and dead insects.

Some of the compounds which showed high mortality on house flies in the screening test were bioassayed on *M. domestica*. In this test, a known quantity of the toxicant was placed in a confined area. The same cages were employed as for the fly screening test. A weighed amount of the toxicant was placed in Pyrex petri dishes having a surface area of 18.8 sq. centimeters along with 1 ml. of acetone. After the solvent was evaporated by air-drying, a cage containing groups of twenty-five female flies, three to five days old, was placed over the residue. Counts of living and dead insects were made forty-eight hours after initiation of the test.

the art that the toxic activity demonstrated hereinbefore on various test species is indicative of activity with species and orders not specifically shown.

The foregoing description is given for clearness of understanding only and no unnecessary limitations should be understood therefrom, as modifications will be obvious to those skilled in the art.

I claim:

1. A compound having the formula

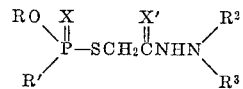

wherein R is lower alkyl; R' is selected from the group consisting of lower alkyl and lower alkoxy; the groups

TABLE I.—MORTALITY OF REPRESENTATIVE SPECIES OF COMMON INSECT ORDERS AND MITES

| Compound Example number (see supra)) | Percent kill/ conc. or amount | Percent kill/conc. | | T. telarius (percent kill/conc.) | | |
|---|---|---|---|---|---|---|
| | M. domestica | B. germanica | O. fasciatus | Post embryonic | Eggs | Systemic (p.p.m.) |
| 1 | [1] 50/25 | 50/0.1 | 50/0.1 | 50/0.03 | 50/0.03 | 50/10 |
| 2 | 50/0.1 | 50/0.1 | 50/0.1 | 50/0.1 | 50/0.1 | 50/10 |
| 4 | 50/0.1 | 50/0.1 | 50/0.1 | 50/0.05 | 50/0.1 | 50/10 |
| 5 | 50/10 | 50/0.1 | 50/0.1 | 50/0.005 | 50/0.008 | 50/1 |

[1] μg.

Of particular utility as pesticidal agents for controlling insects and acarids are the compounds dimethyl phosphorodithioacetyl formylhydrazide and dimethyl phosphorodithiocetyl methylenehydrazide. The phosphonate acetylhydrazides of the instant invention, are useful as pesticides for the control of insects and acarids. In particular the compound ethyl ethoxy phosphonodithioacetyl dimethyl hydrazide is useful as a pesticide to control insects and acarids.

It has been further found that the compounds of the present invention are excellent systemic miticides. In testing for systemic action, pinto bean plants were placed in bottles containing 200 ml. of the test solution and were held in place with cotton plugs. Only the roots were immersed. The solutions were prepared by dissolving the candidate miticide in acetone or other suitable solvent and then diluting with tap water. The final acetone concentration of the solution was never allowed to exceed 1% and the toxicant was initially tested at a concentration of 100 p.p.m. As soon as the plant were placed in the solution, they were infested with mites. Mortalities of post embryonic and ovicidal forms were determined seven days after initiation of the test.

Although the above tests were accomplished with aqueous dispersions, the toxic compounds can also be used commercially in the form of aqueous solutions when appreciably soluble, non-aqueous solutions, wettable powders, vapors, and dusts as best suited to the conditions of use. In many applications, fillers will be incorporated with the toxic compounds. For more specialized applications, the material may even be used in its pure, undiluted form.

When used herein the term "pest" is intended in the restricted sense generally recognized in the art as applying to the lower forms of life customarily controlled by chemical means and excluding the higher animals, the vertebrates, for example, rodents, birds, and larger forms which are more commonly controlled by mechanical means such as traps. It will be apparent to one skilled in represented by X and X' are independently selected from the group consisting of oxygen and sulfur; $R^2$ and $R^3$ are independently selected from the group consisting of hydrogen, methyl, ethyl, formyl, acetyl, and in combination are selected from the group consisting of ethylidene and methylene.

2. The compound according to claim 1 wherein R is lower alkyl, R' is lower alkoxy, X is sulfur, X' is oxygen, $R^2$ is methyl and $R^3$ is methyl.

3. The compound according to claim 2 wherein R is ethyl, R' is ethoxy, X is sulfur, X' is oxygen, $R^2$ is methyl and $R^3$ is methyl.

4. The compound according to claim 2 wherein R is isopropyl, R' is isopropoxy, X is sulfur, X' is oxygen, $R^2$ is methyl and $R^3$ is methyl.

5. The compound according to claim 1 wherein R is lower alkyl, R' is lower alkyl, X is sulfur, X' is oxygen, $R^2$ is methyl and $R^3$ is methyl.

6. The compound according to claim 5 wherein R is ethyl, R' is ethyl, X is sulfur, X' is oxygen, $R^2$ is methyl and $R^3$ is methyl.

7. The compound according to claim 1 wherein R is lower alkyl, R' is lower alkoxy, X is sulfur, X' is oxygen, $R^2$ is hydrogen and $R^3$ is hydrogen.

8. The compound according to claim 7 wherein R is ethyl, R' is ethoxy, X is sulfur, X' is oxygen, $R^2$ is hydrogen and $R^3$ is hydrogen.

9. The compound according to claim 7 wherein R is isopropyl, R' is isopropoxy, X is sulfur, X' is oxygen, $R^2$ is hydrogen and $R^3$ is hydrogen.

References Cited

Kreutzkamp et al. "C.A., vol. 57, 5946-7 (1962).

CHARLES B. PARKER, Primary Examiner

A. H. SUTTO, Assistant Examiner

U.S. Cl. X.R.

260—941, 973, 984; 424—211